United States Patent
Moesby et al.

(10) Patent No.: US 7,066,200 B2
(45) Date of Patent: Jun. 27, 2006

(54) INSERT FOR DYNAMIC FLOW CONTROL

(75) Inventors: Peter Moesby, Slagelse (DK); Bjarne Ibsen, Slagelse (DK)

(73) Assignee: FlowCon International A/S, Slagelse (DK)

( * ) Notice: Subject to any disclaimer, the term of this patent is extended or adjusted under 35 U.S.C. 154(b) by 278 days.

(21) Appl. No.: 10/488,770

(22) PCT Filed: Aug. 29, 2002

(86) PCT No.: PCT/DK02/00565

§ 371 (c)(1),
(2), (4) Date: Mar. 8, 2004

(87) PCT Pub. No.: WO03/023264

PCT Pub. Date: Mar. 20, 2003

(65) Prior Publication Data

US 2005/0016594 A1 Jan. 27, 2005

(30) Foreign Application Priority Data

Sep. 7, 2001 (DK) .................................. 2001 01305

(51) Int. Cl.
*G05D 7/01* (2006.01)
*F16K 3/26* (2006.01)

(52) U.S. Cl. ................... 137/500; 137/454.2; 137/503; 137/504

(58) Field of Classification Search ............. 137/454.2, 137/500, 503, 504
See application file for complete search history.

(56) References Cited

U.S. PATENT DOCUMENTS

| | | | | |
|---|---|---|---|---|
| 1,119,287 A | * | 12/1914 | Krichbaum | ................ 137/500 |
| 3,112,764 A | * | 12/1963 | Anderson et al. | ........... 137/504 |
| 3,131,716 A | | 5/1964 | Griswold et al. | |
| 3,752,183 A | | 8/1973 | Griswold | |
| 3,752,184 A | | 8/1973 | Griswold | |
| 4,074,693 A | * | 2/1978 | Kates | ..................... 137/454.6 |
| 4,080,993 A | | 3/1978 | Lind | |
| 5,054,516 A | | 10/1991 | Okerblom | |
| 5,524,670 A | | 6/1996 | Castle | |

FOREIGN PATENT DOCUMENTS

| | | |
|---|---|---|
| DE | 3508986 | 9/1985 |
| WO | 9512082 | 5/1995 |

(Continued)

Primary Examiner—Stephen M. Hepperle
(74) Attorney, Agent, or Firm—Dykema Gossett PLLC

(57) ABSTRACT

An insert for being mounted in a valve housing (80) or a tubular member for dynamic flow control of a flowing medium. The insert comprises:—a first cup-shaped part (1) provided with an outflow area;—a second cup-shaped part (10) arranged axially displaceably within the first cup-shaped part (1) and provided with an inflow area;—a pressure spring (30) arranged for exerting a force (F) that seeks to force the two cup-shaped parts (1, 10) away from each other. The second cup-shaped part (10) is configured such in relation to the first cup-shaped part (1) that the inflow area of the first cup-shaped part (1) is closed in response to a displacement of the second cup-shaped part (10) in relation to the first cup-shaped part (1). Besides the inflow area of the second cup-shaped part (10) comprises at least one axial inflow slot (12) provided in 15 a sidewall (18) of the second cup-shaped part (10), which inflow slot (12) is closed in response to the displacement of the second cup-shaped part (10) in relation to the first cup-shaped part (1).

9 Claims, 4 Drawing Sheets

FOREIGN PATENT DOCUMENTS

| | | |
|---|---|---|
| WO | 0153730 | 7/2001 |
| WO | 0194817 | 12/2001 |

* cited by examiner

INSERT FOR DYNAMIC FLOW CONTROL

The invention relates to an insert for being mounted in a valve housing or a tubular member for dynamic flow control of a flowing medium, which insert comprises:
- a first cup-shaped part provided with an outflow area comprising at least one axial outflow slot provided in a sidewall of the first cup-shaped part;
- a second cup-shaped part arranged axially displaceably within the first cup-shaped part, and provided with an inflow area;
- a pressure spring arranged for exerting a force that seeks to force the two cup-shaped parts away from each other;

said second cup-shaped part being configured such in relation to the first cup-shaped part, that the at least one axial outflow slot provided in the sidewall of the first cup-shaped part is closed in response to a displacement of the second cup-shaped part in relation to the first cup-shaped part.

One such insert is known from eg WO 95/12082 that shows a valve with an insert configured in this manner. In this prior art insert, the inflow area is constant, whereas the outflow area varies in response to the pressure differential across the insert; the slots constituting the outflow area in the first cup-shaped part being gradually covered by the second cup-shaped part as the pressure differential increases. Hereby the outflow area is reduced, whereby an essentially constant amount of flowing liquid per time unit is obtained in case of varying pressure differentials.

However, it has been found that in practice a completely constant amount per time unit is not achieved, which is primarily due to changes in the spring force that is characteristic for the pressure drop across the inflow area of the insert.

It is therefore the object of the present invention to provide an insert for being mounted in a valve housing or a tubular member for dynamic flow control of a flowing medium, by which insert it is to an even higher degree possible to obtain a constant throughput per time unit than the prior art inserts.

This is obtained by the above-described insert being configured such that the inflow area of the second cup-shaped part comprises at least one axial inflow slot provided in a sidewall of the second cup-shaped part, which inflow slot is closed in response to the displacement of the second cup-shaped part in relation to the first cup-shaped part.

Hereby it is obtained that the inflow area as well as the outflow area varies in response to the pressure differential across the insert, whereby it is possible to obtain a completely constant liquid flow per time unit despite the changes in the spring force from the pressure spring used.

According to a preferred embodiment, the area of the at least one axial inflow slot is to be selected such as to comply with the following condition:

$$\Delta V_i / V_i = -\tfrac{1}{2} \cdot \Delta s / s$$

wherein $V_i$ represents the overall inflow area, $\Delta V_i$ represents a change in the overall inflow area, s is the total compression of the pressure spring and $\Delta s$ is a change of the total compression of the pressure spring. Compliance with this condition results in complete compensation for the increase in the spring force when the pressure spring is compressed during the deformation (compression) of the insert.

Preferably the insert is configured such that its deformation takes place within the interval of 0–35% of the compression of the pressure spring from its free end. Within this interval, the responding spring force of the pressure spring is linearly proportionate with its compression, and therefore it is possible to obtain a simple configuration of the inflow slots. In these conditions, the at least one axial inflow slot can thus be configured with a constant width.

According to a preferred embodiment, the at least one axial inflow slot is closed by a sealing ring provided in the open end of the first cup-shaped part, which sealing ring forms a dynamic sealing in relation to the second cup-shaped part.

The inflow area of the second cup-shaped part may in various embodiments comprise a number of preferably circular inflow openings provided in a sidewall thereof, an inflow opening provided in an end bottom thereof or in the form of inflow openings, whose sizes-can be adjusted continuously. These various embodiments of the inflow openings yield different advantages as will appear from the following.

The invention will now be explained in further detail with reference to the drawing, wherein FIG. 1 is a longitudinal sectional view of a first embodiment of an insert according to the invention;

Figure 1:
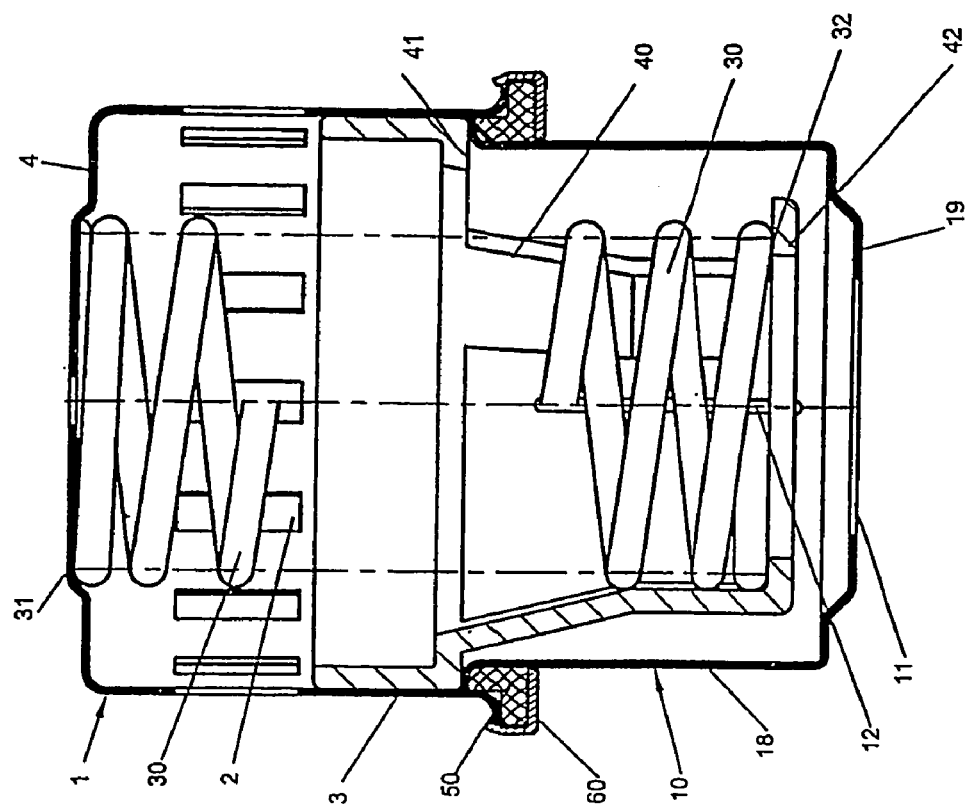

In the following, reference is made to FIG. 1 that shows a first embodiment of an insert according to the invention. The insert comprises a first cup-shaped part 1 with a sidewall 3 and an end bottom 4 and a second cup-shaped part 10 with a sidewall 18 and an end bottom 19. The second cup-shaped part 10 can be displaced axially internally in the first cup-shaped part 1, as will be described later. Between the two cup-shaped parts 1, 10 there is provided a partially compressed pressure spring 30 being, at the one end 31, in abutment on the end bottom 4 of the first cup-shaped part 1, while the other end is in abutment on the end bottom 42 of a spring guide 40. The spring guide 40 comprises a first ring 41 that fits, to a certain extent, within the first cup-shaped part 1 and a second ring that constitutes the end bottom 42 of the spring guide 40. Between the two rings 41, 42, the spring guide 40 is perforated with large openings that allow passage of the medium without significant pressure drops.

The spring guide 40 adjoins the second cup-shaped part 10 at the underside of the ring 41 and is secured there against by means of the spring force transmitted via the pressure spring 30. Between the first cup-shaped part 1 and the second cup-shaped part 10, there is provided a sealing ring 50 that forms a dynamic sealing in relation to the second cup-shaped part 10, when the latter is displaced axially in relation to the first cup-shaped part 1. To fasten all the parts to form one assembled insert, a beading 60 is provided that encloses an outwardly projecting flange on the first cup-shaped part 1 and extends underneath the sealing ring 50 and an outwardly projecting flange arranged above same on the second cup-shaped part 10.

The first cup-shaped portion 1 is, in a manner known per se, in the sidewall 3 provided with a number of axially extending outflow slots 2 that are, in the embodiment shown, evenly distributed along the entire periphery. In a manner also known per se the second cup-shaped part 10 is provided with inflow openings 11 that are, in this embodiment, configured as circular openings located in the sidewall 18. The second cup-shaped part 10 is also provided with a number of axially extending inflow slots 12 with constant width, the effect of which will be described below with reference to FIGS. 4A and 4B.

Figure 2:
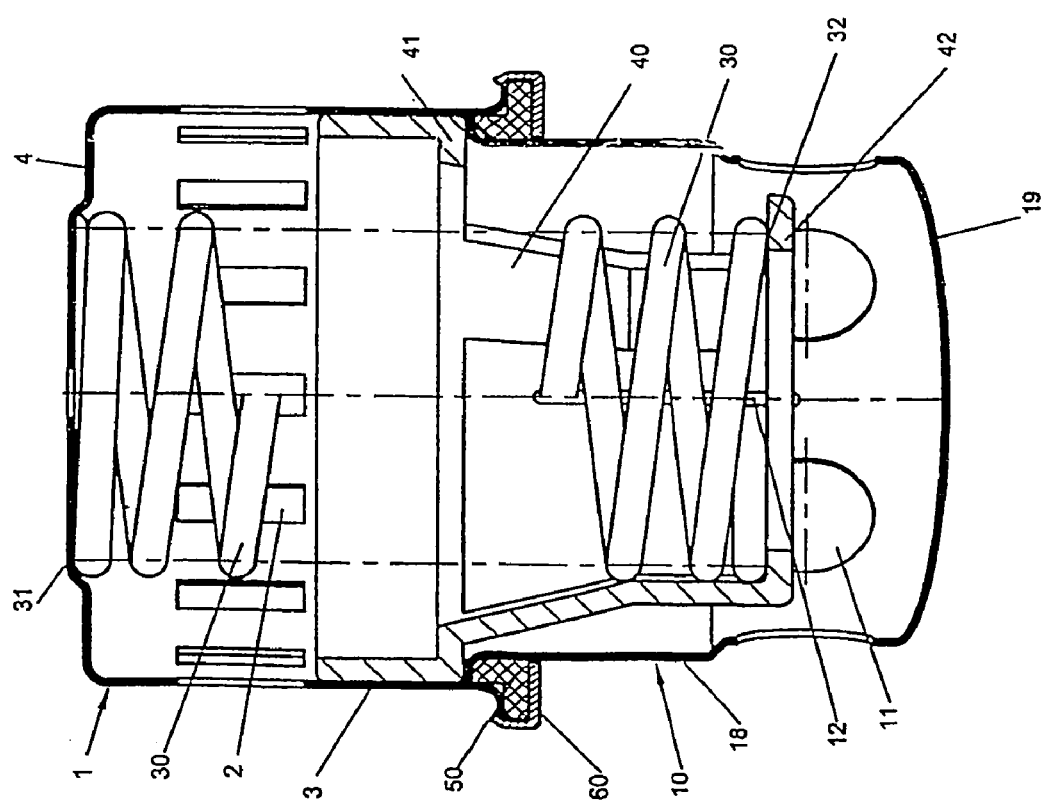
FIG. 2 is a longitudinal sectional view of a second embodiment of an insert according to the invention.

FIG. 2 shows a longitudinal sectional view of a second embodiment of an insert in accordance with the invention. This insert corresponds essentially to the insert shown in FIG. 1 and the same reference numerals are used for the same parts.

The difference between the inserts shown in FIGS. 1 and 2 resides in the location of the inflow openings 11. In the insert shown in FIG. 1 a number of inflow openings 11 are located in the sidewall 18 of the second cup-shaped portion 10, whereas the insert shown in FIG. 2 is provided with just one inflow opening 11 that is located in the end bottom 19 of the second cup-shaped part 10. Flowwise, it is of no consequence whether the inflow openings 11 are located in the sidewall 18 or in the end bottom 19, but it is possible to obtain different advantages by selection of one location rather than the other.

By locating a number of inflow openings 11 in the sidewall 18 (FIG. 1) it is possible to adjust the size of the overall inflow area, either by varying the size of the inflow openings 11 during manufacture thereof, or by means of nozzle inserts (not shown) that can be mounted in the circular inflow openings 11. In this manner the maximal throughput through the insert can be adjusted in a very simple manner. By using eg six inflow openings 11 and just three different sizes of holes (optionally by means of nozzle inserts), it is thus possible to preset the overall flow area to 13 different sizes.

By locating the inflow opening 11 at the end bottom 19 of the second cup-shaped part 10 (FIG. 2) a shorter axial expanse of the second cup-shaped part 10 is obtained, which may be of consequence when incorporating in a valve or tubular member. Furthermore, this embodiment is simpler to manufacture than the embodiment with inflow openings 11 located in the sidewall 18 of the second cup-shaped part 10.

Figure 3A:
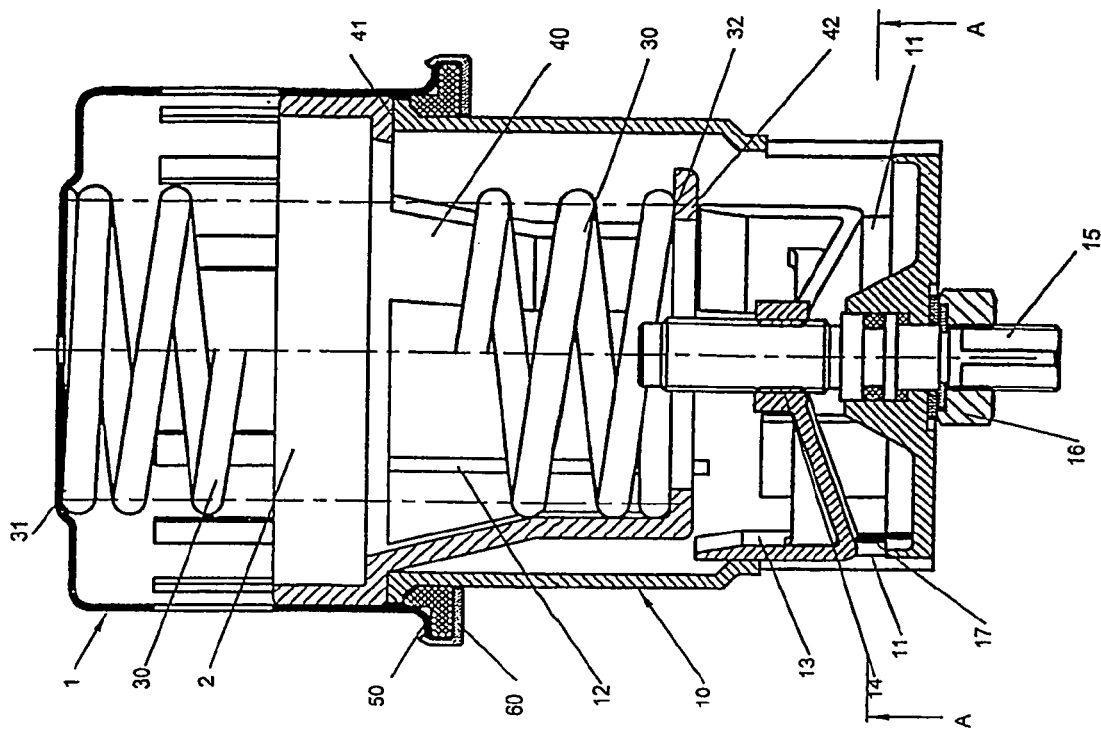
FIG. 3A is a longitudinal sectional view of a third embodiment of an insert according to the invention.

FIG. 3A shows an embodiment of an insert that can continuously be adjusted to a desired inflow area and thus to a desired maximum throughput per time unit through the insert. Again in this embodiment, the same reference numerals are used as in FIGS. 1 and 2 for corresponding parts.

Figure 3B:
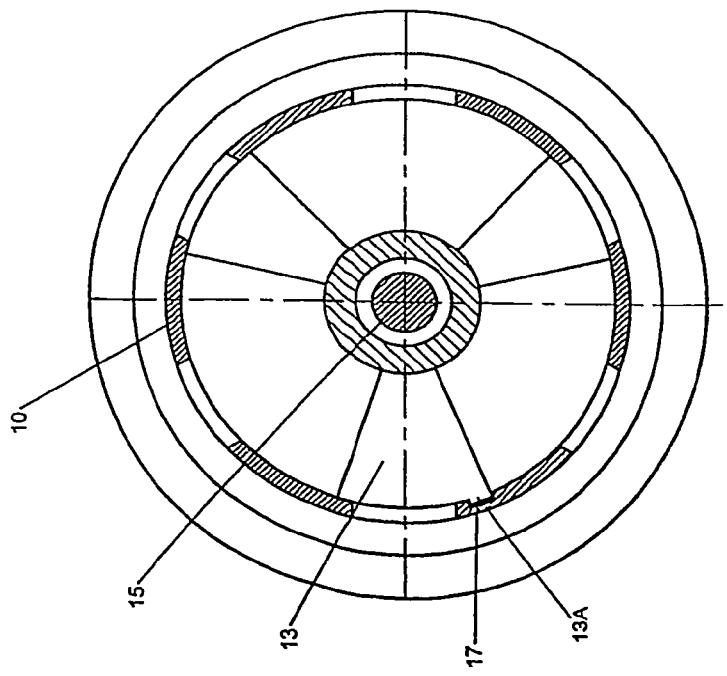
FIG. 3B is a cross sectional view along the line A—A of the embodiment shown in FIG. 3A.

The second-cup shaped part 10 is, in the embodiment shown in FIG. 3A, not provided with an integral end bottom 19, as is the case with the embodiments shown in FIGS. 1 and 2. Rather, the second cup-shaped part 10 is provided with a skirt 13 that is configured such that it is able to close one or more of the inflow openings 11 by an analogous displacement thereof. Preferably the skirt 13 is configured such that the medium is able to flow there through without significant pressure drop, whereby its influence on the flow is minimal. Besides, means are provided for preventing rotation of the skirt 13, which means are, for the embodiment shown, shown in further detail in FIG. 3B that is a sectional view along the line A—A in FIG. 3A. These means comprise an axially extending groove 17 in the second cup-shaped part 10 and a protrusion 13A engaging with the groove 17 and provided on the one leg on the skirt 13.

Via a guide thread 14 the skirt 13 is connected to a spindle 15, in such a manner that a rotation of the spindle 15 produces a linear, axial displacement of the skirt 13 for more or less closing the inflow areas 11. The size of the inflow area is thus preset by rotation of the spindle 15 by means of a suitable key, and the setting may subsequently be locked by means of a lock nut 16 that will, when tightened, prevent undesired self-activation of the spindle 15.

Figure 4A:
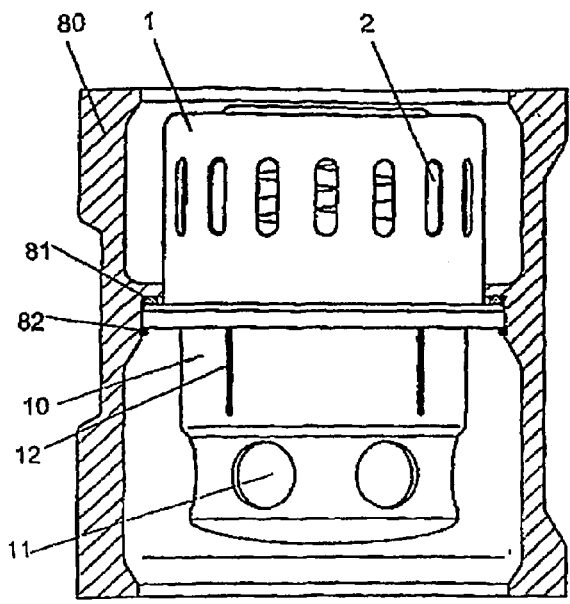
FIG. 4A shows the insert shown in FIG. 1 arranged in a valve housing.
Figure 4B:
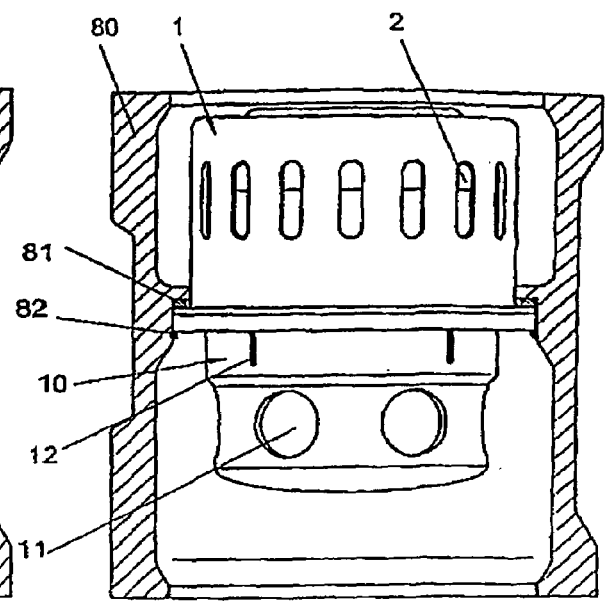
FIG. 4B shows the same as FIG. 4A with an activated insert.

FIGS. 4A and 4B show a plane view of the embodiment of an insert according to the invention shown in FIG. 1 and arranged in a valve housing 80. As shown the outwardly projecting flange on the first cup-shaped part 1 abuts on an inwardly projecting flange 83 provided in the valve housing, there being, however, arranged an O-ring 81 between the insert and the valve housing 80 to provide static sealing between these parts. Hereby it is ensured that the medium passes through the insert and is controlled by same. A spring ring is mounted in a groove in the valve housing 80 for securing the insert therein.

Figure 5:
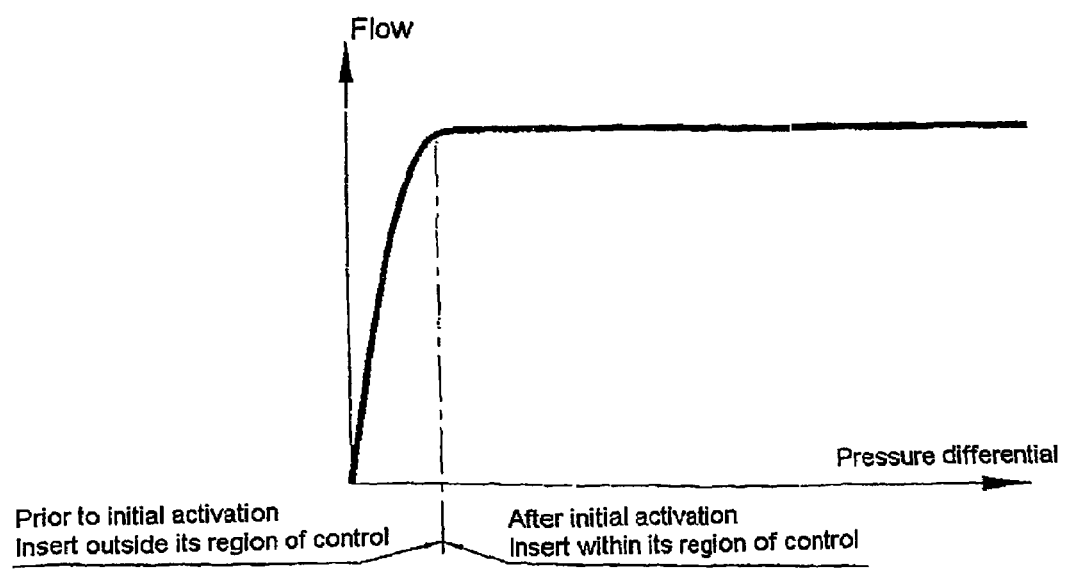
FIG. 5 shows a characteristic flow curve with varying pressure differential across the insert.

If the valve housing 80 is arranged in a tubular system, the insert will initially occupy the position shown in FIG. 4A, wherein the pressure differential across the valve is so small that the insert is not activated for controlling the throughput. This situation is shown more detailed in FIG. 5 that shows a characteristic flow curve in case of varying pressure differential across the insert. As long as the pressure differential is below the control threshold indicated in FIG. 5 with dash-dotted line, the spring force of the pressure spring 30 will be large enough to prevent displacement of the second cup-shaped portion 10 into the first cup-shaped part 1.

In case the pressure differential above the insert increases to a value that is above the threshold indicated, the spring force of the pressure spring 30 will no longer be able to resist the input pressure, and the second cup-shaped portion 10 will gradually be displaced into the first cup-shaped part 1, as shown in FIG. 4B. As will appear from FIG. 4B, the inflow openings 11 are not closed, whereas the inflow slots 2 are gradually closed as a consequence of the increased pressure differential. This function, which is known per se, yields an approximately constant throughput per time unit through the insert. However, the pressure spring 30 contributes with a spring force that is increased with increased pressure differential and thus increased displacement of the second cup-shaped part 10 into the first cup-shaped part 1, and in order to take into account this variation in the spring force, the second cup-shaped part 10 is, according to the invention, provided with axially extending inflow slots 12 with constant width that are closed in response to the displacement of the second cup-shaped part 10 into the first cup-shaped part 1. Closing of the inflow slots 12 is accomplished by the sealing ring 50 that forms, as mentioned above, a dynamic sealing relative to the second cup-shaped part 10, when the latter is displaced axially in relation to the first cup-shaped part 1.

Figure 6:
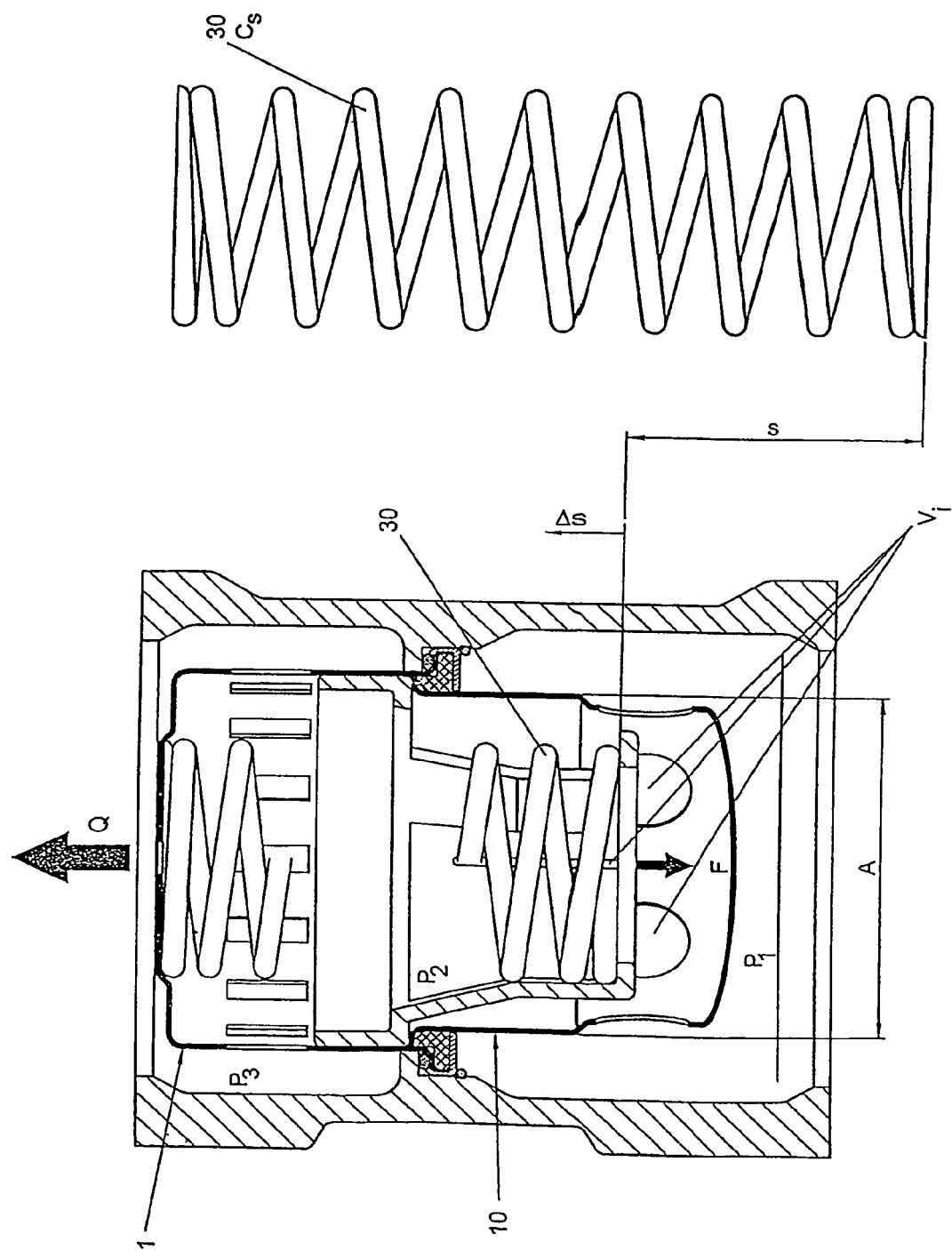
FIG. 6 is a longitudinal sectional view of the insert shown in FIG. 1 and its associated pressure spring.

In the following, the theory behind the present invention will be discussed, reference being made to FIG. 6, which is a longitudinal sectional view of the insert shown in FIG. 1 mounted in a valve housing and the associated pressure spring 30 in unbiased state.

The first cup-shaped part 1 and the second cup-shaped part 10 can be viewed as a cylinder and a piston, respectively, and such piston will assume a position in relation to the cylinder, where the pressure differential ($P_1-P_2$) and its impact on the piston area A will be balanced by the spring force F that is the result of a responding compression of the pressure spring 30. The pressure differential ($P_1-P_2$) is given by the pressure $P_1$ outside the insert and the pressure $P_2$ interiorly of the insert and depends on the size of the overall inflow area. The spring force F of the pressure spring 30 is, in case of a cylindrical pressure spring, proportionate with the total compression of the pressure spring 30, and, in the following, the spring constant will be designated $C_s$.

The total pressure drop above the insert can be designated $(P_1-P_3)$ and it is split into the pressure differential $(P_1-P_2)$ and the remaining pressure drop $(P_2-P_3)$. The remaining pressure drop $(P_2-P_3)$ influences only the relative deformation (compression) of the insert and thus is not a part of the following deductions.

By a given equilibrium of forces for the piston the following applies:

$$(P_1-P_2)\cdot A=F \quad (1)$$

and since the pressure force F is, as indicated above, proportionate with the total compression s of the pressure spring 30, as expressed by:

$$F=C_s\cdot s \quad (2)$$

combination of equation (1) and (2) yields:

$$(P_1-P_2)\cdot A=C_s\cdot S \quad (3)$$

from which the following differential equation can be deduced:

$$d(P_1-P_2)=(C_s/A)\cdot d(s) \quad (4)$$

The throughput or the flow Q through the overall inflow area is given by the product of the inflow area $V_i$, a constant throughput or flow coefficient $f_c$ and the square of the pressure differential across the inflow area; ie:

$$Q=V_i\cdot f_c\cdot\sqrt{(P_1-P_2)} \quad (5)$$

The differential equation of this can be deduced to be:

$$d(Q)=d(V_i)\cdot f_c\cdot\sqrt{(P_1-P_2)}+V_i\cdot f_c\cdot\tfrac{1}{2}\cdot(d(P_1-P_2)/\sqrt{(P_1-P_2)}) \quad (6)$$

The result of the control function of the insert having to be that the throughput is kept constant, it has to apply that $d(Q)=0$, which means that:

$$\frac{1}{2}\cdot V_i\cdot f_c\cdot\left(d(P1-P2)/\sqrt{(P1-P2)}\right)=-fc\cdot\sqrt{(P_1-P_2)}\cdot d(V_i) \quad (7)$$

$$\Downarrow$$

$$\frac{1}{2}\cdot V_i\cdot f_c\cdot d(P1-P2)=-(P1-P2)\cdot d(V_i) \quad (8)$$

From equations (8), (1), (2) and (4) can be deduced:

$$\frac{1}{2}\cdot V_i\cdot (C_s/A)\cdot d(s)=-(C_s/A)\cdot s\cdot d(V_i) \quad (9)$$

$$\Downarrow$$

$$\frac{1}{2}\cdot V_i\cdot d(s)=-s\cdot d(V_i) \quad (10)$$

Equation (10) expresses that by relatively small changes in the deformation of the insert in relation to the total compression of pressure spring (30) from its free length, the relative change in the inflow area will be proportionate with the deformation of the insert. This can also be expressed as follows:

$$\Delta V_i/V_i=-\tfrac{1}{2}\cdot\Delta s/s \quad (11)$$

It will thus appear that at least in case of a relative deformation smaller than 35% of the compression of the pressure spring 30 from its free length, a linear change of the inflow area in accordance with equation (11) will result in a constant throughput through the insert. It is precisely this circumstance that is utilised in the present invention, where the second cup-shaped part 10 is provided with axial inflow slots 12 with constant width that are closed in response to the displacement of the second cup-shaped part 10 into the first cup-shaped part 1.

The invention was described with reference to preferred embodiments. However, nothing prevents other configurations of the insert than described above and shown in the figures. For instance there may be provided more or fewer inflow openings 11 and/or inflow slots 12, and likewise the number of outflow openings 2 may of course also be varied as needed. The size and location of the inflow openings 11, the inflow slots 12 and the outflow slots 2 may of course also be varied as needed. Finally one single inflow slot 12 with constant width can be achieved by combining a number of inflow slots with varying widths, provided the sum of these widths in any cross section is constant.

The invention claimed is:

1. An insert for being mounted in a valve housing (80) or a tubular member for dynamic flow control of a flowing medium, which insert comprises:
   a first cup-shaped part (1) provided with an outflow area comprising at least one axial outflow slot (2) provided in a sidewall (3) of the first cup-shaped part;
   a second cup-shaped part (10) arranged axially displaceably within the first cup-shaped part (1) and provided with an inflow area;
   a pressure spring (30) arranged for exerting a force (f) that seeks to force the two cup-shaped parts (1, 10) away from each other;
   said second cup-shaped part (10) being configured such in relation to the first cup-shaped part (1) that the at least axial outflow slot (2) provided in the sidewall (3) of the first cup-shaped part (1) is closed in response to a displacement of the second cup-shaped part (10) in relation to the first cup-shaped part (1),
   wherein the inflow area of the second cup-shaped part (10) comprises at least one axial inflow slot (12) provided in a sidewall (18) of the second cup-shaped part (10), which inflow slot (12) is closed in response to the displacement of the second cup-shaped part (10) in relation to the first cup-shaped part (1).

2. An insert according to claim 1, wherein the area of the at least one axial inflow slot (12) is selected so as to comply with the following condition;

$$\Delta V_i/V_i=\tfrac{1}{2}\Delta s/s$$

wherein $V_i$ represents the overall inflow area, $\Delta V_i$ represents a change in the overall flow area, s is the total compression of the pressure spring and $\Delta s$ is a change of the total compression of the pressure spring.

3. An insert according to claim 2, wherein the deformation of the insert takes place within the interval 0–35% of the compression of the pressure spring (30) from its free end.

4. An insert according to claim 3, wherein the at least one axial inflow slot (12) has a constant width.

5. An insert according to claim 1, wherein the at least one axial flow slot (12) is closed by sealing ring (50) provided at an open end of the first cup-shaped part (1), which sealing ring (50) forms a dynamic sealing in relation to the second cup-shaped part (10).

6. An insert according to claim 1, wherein that the inflow area of the second cup-shaped part (10) comprises a number of inflow openings (11) provided in a sidewall (18) thereof.

7. An insert according to claim 6, wherein the inflow openings (11) are configured as circular openings.

8. An insert according to claim 1, wherein the inflow area of the second cup-shaped part (10) comprises an inflow opening (11) provided in an end bottom (19) thereof.

9. An insert according to claim 1, wherein the inflow area of the second cup-shaped part (10) comprises inflow openings (11) whose size can be set continuously.

* * * * *